United States Patent [19]

Hall et al.

[11] Patent Number: 4,914,818

[45] Date of Patent: Apr. 10, 1990

[54] COAXIAL CABLE CUTTER

[75] Inventors: Leslie C. Hall, Grandview; Robert S. Hedges, Belton, both of Mo.

[73] Assignee: The United States of America as represented by the United States Department of Energy, Washington, D.C.

[21] Appl. No.: 235,079

[22] Filed: Aug. 23, 1988

[51] Int. Cl.⁴ .............................................. H02G 1/12
[52] U.S. Cl. .......................................... 30/90.1; 81/9.4
[58] Field of Search .................... 30/90.1, 90.2, 90.3, 30/92.5; 81/128, 9.4, 9.41, 9.42, 9.43, 9.51; 29/33 F, 564.4; 279/41, 43, 1 B, 42 C

[56] References Cited

U.S. PATENT DOCUMENTS

| | | |
|---|---|---|
| 980,600 | 1/1911 | Church. |
| 3,659,483 | 5/1972 | Matthews ............................ 81/9.5 C |
| 3,713,215 | 1/1973 | Van Dalen et al. .................. 30/90.1 |
| 3,971,129 | 7/1976 | Adams ................................. 30/90.1 |
| 4,027,557 | 6/1977 | Stepan ................................. 81/9.5 R |
| 4,111,076 | 9/1978 | Rocha et al. ........................ 81/9.43 |
| 4,203,333 | 5/1980 | Campari .............................. 81/9.5 A |
| 4,368,654 | 1/1983 | Kober et al. ........................ 81/9.5 R |
| 4,426,778 | 1/1984 | Christie .............................. 30/90.1 |
| 4,594,029 | 6/1986 | Michael, III ........................ 408/1 R |

Primary Examiner—Hien H. Phan
Assistant Examiner—Y. Lin
Attorney, Agent, or Firm—Anne D. Daniel; James H. Chafin; William R. Moser

[57] ABSTRACT

A cutting device is provided which is useful in trimming the jackets from semi-rigid coaxial cables and wire having a cutting bit and support attached to movable jaws. A thumbpiece is provided to actuate the opening of the jaws for receiving the cable to be trimmed, and a spring member is provided to actuate the closing of the jaws when thumbpiece is released. The cutting device utilizes one moving part during the cutting operation by using a rolling cut action. The nature of the jaws allows the cutting device to work in space having clearances less than 0.160 inches.

10 Claims, 1 Drawing Sheet

COAXIAL CABLE CUTTER

The Government has rights in this invention pursuant to Contract No. DE-AC04-76DP00613 awarded by the U.S. Department of Energy to Allied-Signal Inc.

BACKGROUND OF THE INVENTION

Precise cutting and trimming of semi-rigid coaxial cables in various electronic applications, such as sophisticated radar devices or communication devices where the matching of the impedance is crucial, is very important because the length of the coaxial cable will affect the performance of these high frequency devices. The coaxial cable, used in such equipment, must have precise lengths to ensure a very tight tolerance of the phase shifting of the high frequency signals moving along the cable.

Various cutting devices have been used in the past; however, these cutting devices lacked the capability of cutting or trimming to a precise length in an area of very small clearance. Also, the cutting devices were constructed of a great number of components each requiring a critical fabrication tolerance, and when the cutter bits required replacement due to dullness or nicks, a skilled machinist was needed to replace the cutter bit.

SUMMARY OF THE PRESENT INVENTION

Accordingly, it is an objective of the present invention to provide a coaxial cable cutter capable of cutting a semi-rigid coaxial cable to a desired length with a high degree of precision.

It is a further objective of the present invention to provide a coaxial cable cutter capable of cutting a cable to a desired length with a high degree of precision in a space having a restricted or very small clearance.

It is still another objective of the present invention to provide a coaxial cable cutter capable of cutting a cable to a desired length with a high degree of precision, that is constructed of a minimum number of components that require critical fabrication tolerance.

Another objective of the present invention is to provide a coaxial cable cutter capable of cutting a cable to a desired length with a high degree of precision, that is constructed with a cutter bit which can be replaced easily without the need for a skilled machinist.

Other objectives of the present invention will become apparent upon reading the detailed description below and referring to the accompanying drawings. It should be understood, however, that the detailed description and the specific example, while indicating a preferred embodiment of the present invention, are given as illustrative only. Various changes and modifications within the spirit and scope of the present invention will become apparent to those skilled in the art from the detailed description given below.

BRIEF DESCRIPTION OF THE DRAWINGS

The present invention is further described by the accompanying drawings which are illustrative only, and thus are not limitative of the present invention and wherein.

DETAILED DESCRIPTION OF THE PRESENT INVENTION

Figure 1:
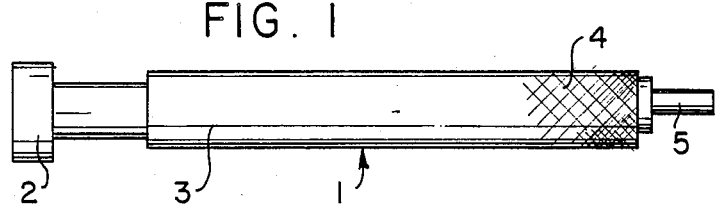
FIG. 1 shows the general construction of the present invention.

The construction of the present invention is described below with reference to the drawings. Like reference numerals in the drawings correspond to like items or components.

According to the present invention, a coaxial cable cutter 1, as seen in FIG. 1, comprises a thumbpiece 2, a cylinder part 3, a cross-hatched surface cylinder part 4, and a cutter head 5. The coaxial cable cutter 1 is held by an operator in a manner similar to holding a mechanical pencil. The thumbpiece 2 is used to activate the cutting head 5. A more detailed description of the coaxial cable cutter's operations is given below.

Figure 2B:
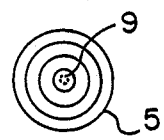
FIG. 2(b) shows a top view of the present invention as shown in FIG. 2(a)
Figure 2A:
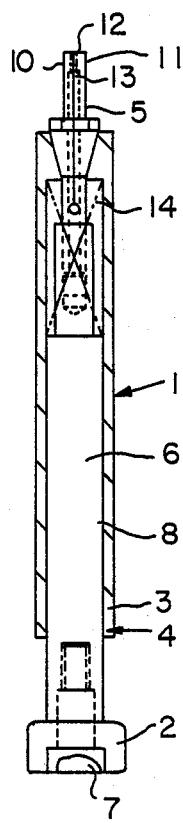
FIG. 2(a) shows a longitudinal, cross-sectional, detail view of the present invention.

FIG. 2(a) shows a more detailed construction of the present invention. The coaxial cable cutter 1 comprises a thumpiece 2 which is attached to a transfer shaft 6 by a screw 7. The transfer shaft is positioned in a hollowed out cylindrical tube 3 having an internal cylinder part 8 and a cross-hatched surface cylinder part 4. At the end of the cylindrical tube farthest from the thumbpiece 2, a cutter head 5 is located.

Figure 3:
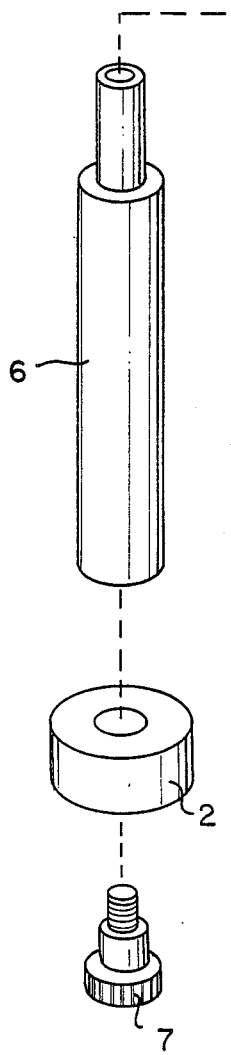
FIG. 3 shows an exploded view of the present invention.
Figure 3:
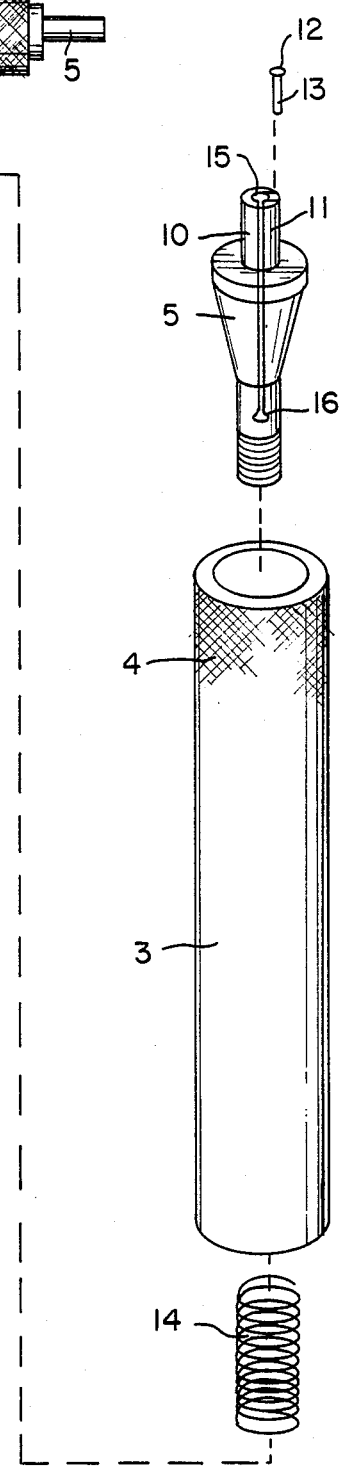

The cutter head 5 comprises two movable jaws 10 and 11. Positioned on the movable jaw 11 is a cutter bit 12, inserted into the movable jaw by an attached shaft 13. The cutter bit 12 has an upper knife edge, is integral with the shaft 13, and has a frusto-conical shape which tapers to the narrower diameter of the shaft 13. As can be seen in FIG. 2(b), the cutter head 5 contains a hole 9 at its center. In FIG. 2(a), material has been removed from each of two opposite sides of the conical-shaped area on cutter head 5 so that it has an elliptical shape for optimum fitting and operation within the conical area on tube 3. As illustrated in FIG. 3, a hole 16 is formed at the bottom of cutter head 5 which along with the heat treatment of jaws 10 and 11 provides for the critical spring action between the jaws.

FIG. 3 shows a preferred embodiment of the coaxial cable cutter 1 of the present invention, having a shoulder screw 7, a thumbpiece 2, transfer shaft 6, a spring 14, a cross-hatched surface housing 4, a cutter head 5, and a cutter bit 12. The shoulder screw 7 attaches the thumbpiece 2 to the transfer shaft 6 in such a manner that the thumbpiece 2 is free to turn during the rotation of the coaxial cable cutter when the cutting of the cable is occurring.

The construction of this cutting device according to the present invention allows the operator to trim a cable in a space having only a clearance of about 0.055 inches between the coaxial cable and an obstruction. Result is realized because the diameter of the jaws at this point is about 0.150 inches. This advantage is very useful in fine space electronic assembly work. The cutting device, according to the present invention, has only one part that moves during the cutting operation which allows the cutter of the present invention to have fewer bearing surfaces, better operation, less wear, and less maintenance than the conventional devices. Lastly, the construction of the cutting device, according to the present invention, allows the operator to trim a coaxial cable to a precise length ±0.005 inches.

OPERATION OF THE PRESENT INVENTION

To trim a semi-rigid coaxial cable, the coaxial cable cutter of the present invention is held in a manner similar to holding a mechanical pencil. The thumbpiece 2 is depressed by the operator. This pressure applied to the thumbpiece 2 is transferred into the cutter head 5 via the transfer shaft 6. Thus, the depressing of the thumbpiece 2 permits the movable jaws, 10 and 11, to open apart from each other. This opening allows the operator to insert the coaxial cable into the present invention for trimming.

Upon release of the thumbpiece 2, the spring 14 causes the jaws, 10 and 11, to close around the cable by applying pressure to the transfer shaft in the opposite direction of the pressure applied to open the jaws, 10 and 11. The pressure applied by the spring also causes the cutter bit 12 to penetrate or cut into the metallic jacket of the coaxial cable, the support surface 15 on jaw 10 holds the coaxial cable on the opposite side of the cutter bit 12.

To achieve the trimming of the coaxial cable, the jaws, 10 and 11, are closed around the cable causing the cutter bit 12 to penetrate into the cable's jacket. The metal center conductor wire in the coaxial cable is not penetrated by the cutter bit 12 because of the tool's dimension. The complete trimming of the coaxial cable is accomplished by resting the thumbpiece 2 in the palm of the operator's hand and rotating the cylindrical tube or housing 3 with the operator's thumb and fingers or any other manner as may be desired. The rotating of the housing 3 causes the cutter bit 12 to rotate completely around the coaxial cable. The jacket on the coaxial cable may be either cut completely through or only scored, depending upon the number of revolutions the coaxial cable cutter is turned.

Once the jacket is cut or scored, as desired, the thumbpiece 2 is depressed again, causing the jaws, 10 and 11, to open, thereby allowing the coaxial cable to be removed. The scrap portion of the cable jacket may now be removed by pulling it off with either pliers or fingers.

The cutter bit 12 utilized in the present invention, is hardened and precision ground to its desired dimensions. The cutter bit 12 is also designed to produce a "rolling cut" for cleaner cuts and to provide easy user replacement after becoming dulled or nicked. Furthermore, the cutter head 5 is magnetized to magnetically attract the metal cutter bit 12. This magnetic attraction prevents loss of the cutter bit 12. Lastly, the cutter bit 12 is positioned flush with the end of the cutter head 5 during use and is restrained by a restraining surface, not shown, to prevent a "corkscrewing" cutting action.

The invention being thus described, it will be obvious that many variations and modifications will be apparent to those skilled in the art. Such modifications are not to be regarded as a departure from the spirit and scope of the present invention, and all such modifications as would be obvious to one skilled in the art are intended to be included with the scope of the following claims.

We claim:

1. A cutting device for trimming a coaxial cable, comprising:
   a hollow, cylindrical-shaped housing member having a longitudinal axis and two ends;
   a thumbpiece positioned at a first end of said housing member;
   a transfer shaft, attached to said thumbpiece, positioned within said hollow housing member;
   a spring member, attached to said housing member and said transfer shaft, positioned within said hollow housing member;
   jaw members, attached to said transfer shaft and said spring member, positioned at a second end of said housing member; and
   a cutting member, attached to said jaw members, for providing the cutting action needed for trimming the coaxial cable;
   whereby said thumbpiece, upon receiving pressure, transfers said pressure to said jaw members through said transfer shaft, thereby permitting said jaw members to open;
   and said spring member, upon release of said pressure from said thumbpiece, transfers a force to said jaw members, thereby causing said jaw members to close.

2. The cutting device of claim 1, wherein said jaw members have a diameter that allows said cutting device to operate in a space having a clearance between the coaxial cable and an obstruction of about 0.055 inches.

3. The cutting device of claim 1, wherein said jaw members bear against a restraining surface which allows an operator to trim a coaxial cable to a desired length within ±0.005 inches of the desired length.

4. The cutting device as claimed in claim 1, wherein said cutting member includes,
   a cutting bit, attached to one of said jaw members, for providing a cutting operation and a
   support surface on a jaw member positioned opposite to the other of said jaw members having said cutting bit attached thereto, for providing support to the coaxial cable being trimmed during the cutting operation.

5. The cutting device of claim 4, wherein said cutting bit is metal.

6. The cutting device of claim 5, wherein said jaw members are magnetized to magnetically attract said cutting bit.

7. The cutting device of claim 4, wherein said cutting bit is selectively slidably engageable in said jaw member for cutting.

8. The cutting device of claim 2, wherein said jaw members have a diameter of about 0.150 inches.

9. The cutting device of claim 3, wherein said jaw members have a diameter of about 0.150 inches.

10. The cutting device of claim 4, wherein said cutting bit has a tapering frusto-conical shape, capable of producing a rotating cut.

* * * * *